(12) United States Patent
Rusu et al.

(10) Patent No.: US 6,264,266 B1
(45) Date of Patent: Jul. 24, 2001

(54) TONNEAU COVER AND ATTACHMENT ASSEMBLY

(75) Inventors: William D. Rusu, West Bloomfield, MI (US); Timothy J. Miller, Ligonier, IN (US); Samuel A. Hochstetler, Topeka, IN (US); Robert G. Prince, Ft. Wayne, IN (US)

(73) Assignee: The Budd Company, Troy, MI (US)

( * ) Notice: Subject to any disclaimer, the term of this patent is extended or adjusted under 35 U.S.C. 154(b) by 0 days.

(21) Appl. No.: 09/686,228

(22) Filed: Oct. 11, 2000

Related U.S. Application Data

(62) Division of application No. 09/389,183, filed on Sep. 2, 1999, now Pat. No. 6,183,035.

(51) Int. Cl.$^7$ .......................................... B60J 7/00
(52) U.S. Cl. ................. 296/100.07; 296/100.18; 296/100.16; 296/100.06; 296/100.17
(58) Field of Search .................. 296/100.06, 100.07, 296/100.16, 100.17, 100.18; 248/231.5, 231.41

(56) References Cited

U.S. PATENT DOCUMENTS

| | | |
|---|---|---|
| D. 279,473 | 7/1985 | Hochstetler et al. . |
| 3,420,570 | 1/1969 | Kunz . |
| 3,514,152 | 5/1970 | Hermon . |
| 4,216,990 | 8/1980 | Musgrove et al. . |
| 4,313,636 | 2/1982 | Deeds . |
| 4,730,866 * | 3/1988 | Nett ................................. 296/100.18 |
| 4,762,360 | 8/1988 | Huber . |
| 4,824,162 | 4/1989 | Geisler et al. . |
| 4,838,602 | 6/1989 | Nett . |
| 4,861,092 | 8/1989 | Bogard . |
| 4,901,963 * | 2/1990 | Yoder ................................. 248/231.5 |
| 4,946,217 | 8/1990 | Steffens et al. . |
| 4,953,820 | 9/1990 | Yoder . |
| 5,121,960 | 6/1992 | Wheatley . |
| 5,183,309 | 2/1993 | Jordan . |
| 5,251,950 | 10/1993 | Bernardo . |
| 5,263,761 | 11/1993 | Hathaway et al. . |
| 5,275,458 | 1/1994 | Barben et al. . |
| 5,301,913 * | 4/1994 | Wheatley ......................... 248/231.41 |
| 5,310,238 | 5/1994 | Wheatley . |
| 5,322,336 | 6/1994 | Isler . |
| 5,344,159 | 9/1994 | Powell . |
| 5,385,377 * | 1/1995 | Girard ............................... 296/100.16 |
| 5,460,423 | 10/1995 | Kersting et al. . |
| 5,487,585 * | 1/1996 | Wheatley ......................... 296/100.18 |
| 5,522,635 * | 6/1996 | Downey ........................... 296/100.16 |

(List continued on next page.)

FOREIGN PATENT DOCUMENTS 2540966  4/1997 (JP) .

*Primary Examiner*—D. Glenn Dayoan
*Assistant Examiner*—Kiran B. Patel
(74) *Attorney, Agent, or Firm*—Harness, Dickey & Pierce, P.L.C.

(57) ABSTRACT

A clamp assembly for mounting a tonneau cover on a motor vehicle having a cargo area defined by first and second side walls, an end wall and a tailgate, the side walls having an inner panel and an outer panel includes a fastener, a first coupler plate and a bracket. The first coupler plate has a first end and a second end. The first coupler plate is articulable from an operable position to a disengaged position. The bracket has a generally horizontal rail and a vertical rail. The bracket is adapted for contacting the outer panel of the first side wall and further has a seat pivotally retaining the first end of the first coupler plate. The second end of the first coupler plate is adapted for engaging the inner panel of the first side wall defining a first restraining area between the horizontal rail and the second end of the first coupler plate. A second restraining area between the vertical rail and the second end of the first coupler plate is also defined. The fastener detachably interconnects the first coupler plate and the bracket when the first coupler plate is in the operable position.

8 Claims, 4 Drawing Sheets

U.S. PATENT DOCUMENTS

| | | |
|---|---|---|
| 5,584,521 | 12/1996 | Hathaway et al. . |
| 5,632,522 | 5/1997 | Gaitan et al. . |
| 5,633,522 * | 5/1997 | Gaitan et al. .................. 296/100.06 |
| 5,636,893 * | 6/1997 | Wheatley et al. ............. 296/100.07 |
| 5,653,491 | 8/1997 | Steffens et al. . |
| 5,655,808 * | 8/1997 | Wheatley ........................ 296/100.17 |
| 5,857,729 | 1/1999 | Bogard . |
| 5,860,691 * | 1/1999 | Thomson et al. ............... 296/100.18 |
| 5,904,393 * | 5/1999 | Yoder .............................. 296/100.17 |
| 5,906,407 | 5/1999 | Schmeichel . |
| 5,931,521 | 8/1999 | Kooiker . |
| 6,024,402 * | 2/2000 | Wheatley ........................ 296/100.18 |
| 6,053,557 | 4/2000 | Kooiker . |
| 6,082,806 * | 7/2000 | Bogard ............................ 296/100.06 |

* cited by examiner

TONNEAU COVER AND ATTACHMENT ASSEMBLY

This is a division of U.S. patent application Ser. No. 09/389,183, filed Sep. 2, 1999 now U.S. Pat. No. 6,183,035.

FIELD OF THE INVENTION

The present invention generally relates to a device for covering the box of a vehicle having an open cargo area. More particularly, the present invention relates to a tonneau cover and attachment assembly mounted on a cargo-carrying vehicle.

BACKGROUND OF THE INVENTION

Vehicles such as pick-up trucks having an open cargo area are useful for transporting a wide variety of cargo. However, cargo transported in these type of vehicles is susceptible to environmental exposure. Therefore, various tops, caps, and tonneau covers have been designed to cover the cargo area and limit the ingress of rain, sleet, snow and the like. In addition, the aforementioned covers prevent egress of cargo as the vehicle is being operated.

An example of one such tonneau cover includes a pair of hard panels pivotally interconnected by a transversely extending hinge. In their closed positions, the panels lie flat on top a pair of vertical side walls defining the cargo area. In other examples, the tonneau cover consists of a plurality of panels folding in a manner similar to an accordion, stackable one against the other. However, existing tonneau covers are not without their disadvantages.

One disadvantage relates to the difficulty of securing the tonneau covers to the vehicle. Specifically, some prior art structures require holes to be bored in the vertical side walls or vehicle bed to provide a method of attaching special mounting brackets. Such holes compromise the structural integrity of the truck box and also increase the susceptibility to corrosion over time. In addition, special tools and extra installation time are often required to mount these devices to the vehicles.

As is commonly known, other coupling assemblies exist that do not require the drilling of additional mounting holes. These devices also have their disadvantages. Specifically, many of the existing coupling assemblies fail to adequately secure the covers to the bed which is of particular importance in off-road operation of the vehicle. Conversely, the present invention provides a multi-point retention of the brackets to restrain against longitudinal and transverse displacement In addition, the present invention takes advantage of the structure of the vertical side walls to position and further restrain the coupling assemblies.

Another disadvantage concerning the prior art devices relates to dividing the cargo area into individual compartments. Most tops or covers simply enclose the cargo area without subdividing it. If a vehicle operator using these devices wishes to segregate different types of cargo, he must make additional accommodations to restrain or tie down the cargo. Conversely, other devices create a separate subdivided compartment within the cargo area. However, these devices are usually solid wall structures that permanently reduce the volume of cargo area available to the operator. Therefore, these structures occupy valuable cargo space when separate compartments are not necessary and a larger cargo area would be beneficial.

SUMMARY OF THE INVENTION

Accordingly, it is an object of the present invention to provide a tonneau cover adaptable for use with new or existing vehicles and securable to the vehicle body without requiring additional holes in the vehicle side walls or vehicle bed.

It is another object of the present invention to provide a cargo area divider coupled to the bed for movement between a deployed position where the divider separates the truck bed into two segments and a retracted position where the divider is substantially parallel to one of the tonneau cover panels.

The present invention includes a clamp assembly for mounting a tonneau cover on a motor vehicle having a cargo area defined by first and second side walls, an end wall and a tailgate. The side walls have an inner panel and an outer panel. The clamp assembly includes a fastener, a first coupler plate having a first end and a second end and a bracket having a generally horizontal rail and a vertical rail. The first coupler plate is articulable from an operable position to a disengaged position. The bracket is adapted for contacting the outer panel of the first side wall and further has a seat pivotally retaining the first end of the first coupler plate. The second end of the first coupler plate is adapted for engaging the inner panel of the first side wall defining a first restraining area between the horizontal rail and the second end of the first coupler plate. A second restraining area between the vertical rail and the second end of the first coupler plate is also defined. The fastener detachably interconnects the first coupler plate and the bracket when the first coupler plate is in the operable position.

Further objects, features and advantages of the present invention will become apparent from a consideration of the following description and the appended claims, when taken in connection with the accompanying drawings.

BRIEF DESCRIPTION OF THE DRAWINGS

The various advantages of the present invention will become apparent to one killed in the art by reading the following specification and subjoined claims and by referencing the following drawings in which:

DETAILED DESCRIPTION OF THE PREFERRED EMBODIMENT

Figure 1:
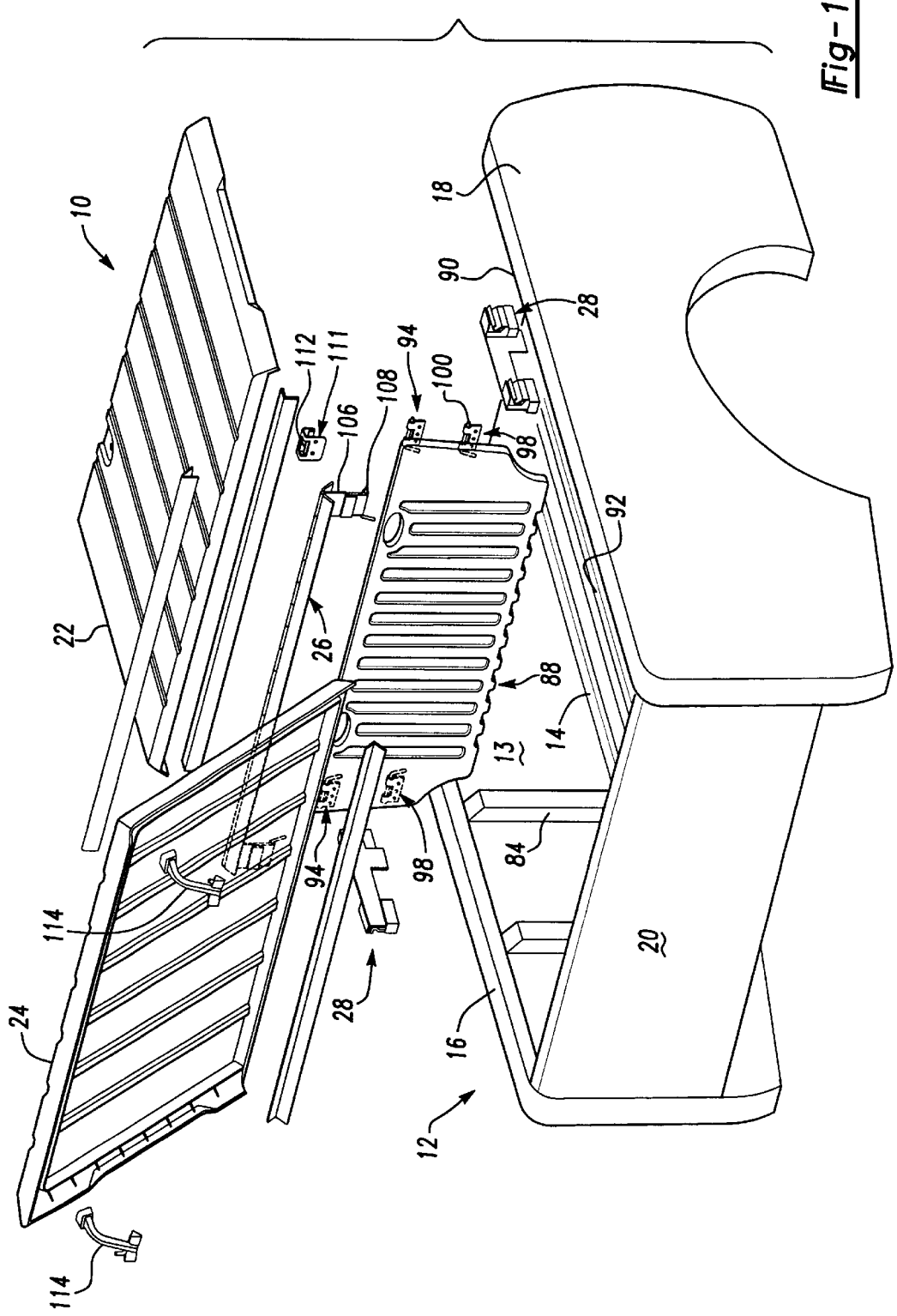
FIG. 1 is an exploded perspective view of an embodiment of the tonneau cover and attachment assembly constructed in accordance with the present invention.

With reference to the drawings, a tonneau cover and attachment assembly constructed in accordance with the teachings of an embodiment of the present invention is generally identified at reference numeral 10. The tonneau cover assembly 10 is shown operatively associated with an exemplary motor vehicle 12. In the preferred embodiment, the vehicle 12 is a pick-up truck having a cargo area 13 generally defined by a bed 14, a first side wall 16, a second side wall 18 and a tailgate 20.

As best shown in FIG. 1, the tonneau cover assembly 10 is illustrated to generally include a first cover 22 and a second cover 24 rotatably interconnected by a hinge 26. The hinge 26 is detachably coupled to a pair of clamp assemblies 28 as hereinafter described. One skilled in the art will appreciate that each of the clamp assemblies 28 are substantial mirror images of each other. Accordingly, only one clamp assembly 28 will be described in detail.

In general, each clamp assembly 28 functions to conveniently and securely connect the covers 22 and 24 to the vehicle side walls 16 and 18 without requiring any special tools or additional mounting holes. The clamp assemblies 28 are positioned along each of the first and second side walls 16 and 18 near the middle of the cargo area 13. Because each of the clamp assemblies 28 includes a multi-point interaction with the vehicle 12, a very secure attachment capable of withstanding high input loads results. Specifically, the clamp assemblies 28 resist both longitudinal and transverse displacement as well as any rotational articulation.

Figure 2:
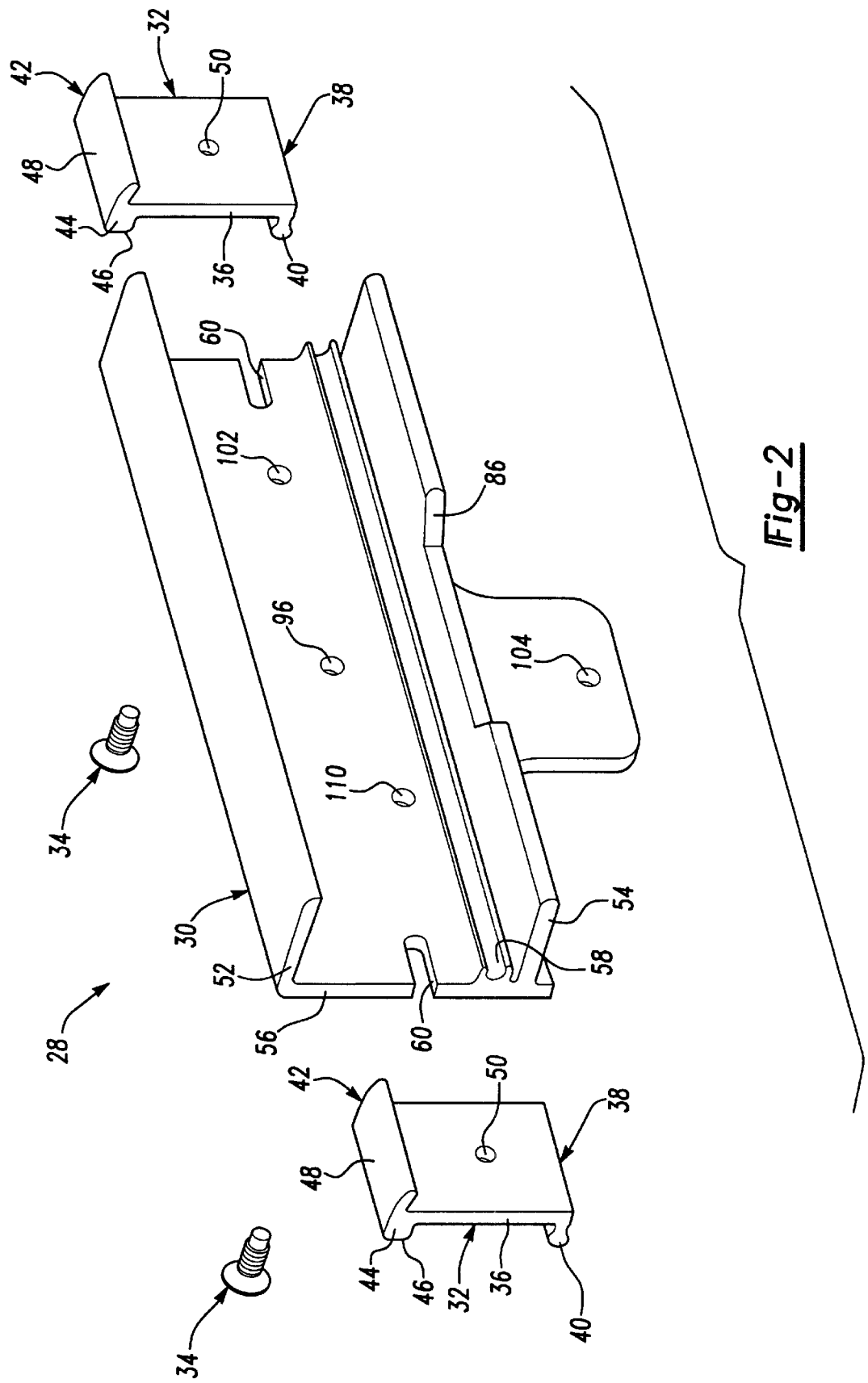
FIG. 2 is an exploded perspective view of an embodiment of the clamp assembly constructed in accordance with the present invention.
Figure 3:
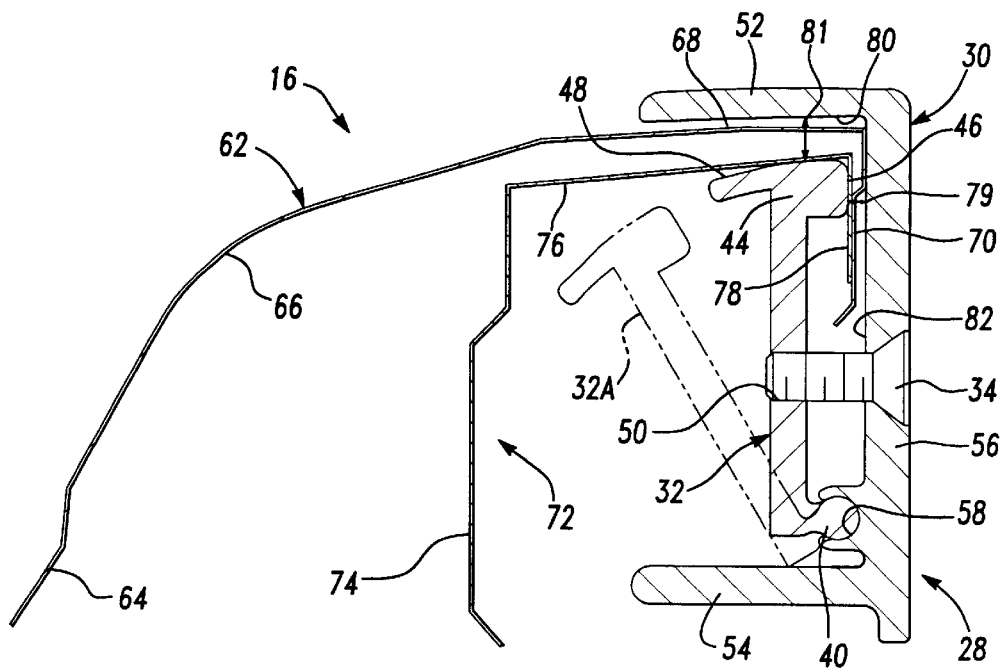
FIG. 3 is a cross sectional view of a portion of the clamp assembly of the present invention.

As shown in FIGS. 2 and 3, each clamp assembly 28 includes an extruded bracket 30, a pair of coupler plates 32, and a pair of threaded fasteners 34. Each of the coupler plates 32 includes a generally planar body 36 having a first end 38 with a bulbous finger 40 extending orthogonally therefrom and a second end 42 having a hammer shaped cam 44. The hammer shaped cam 44 includes a generally planar first bearing surface 46 and an arcuate second bearing surface 48, the function of which will be described in greater detail hereinafter. Each of the coupler plates 32 further includes a threaded aperture 50 for receipt of the fastener 34.

The extruded bracket 30 is a generally "C" shaped channel having opposing upper and lower rails 52 and 54 interconnected by a side rail 56. The extruded bracket 30 includes a seat 58 extending the length of the extruded bracket 30 to slidably accommodate the bulbous finger 40 of the coupler plate 32. Accordingly, once the bulbous finger 40 of each coupler plate 32 is disposed within the seat 58 of the extruded bracket 30, the coupler plates 32 are articulable from an operable position to a disengaged position depicted in phantom line as 32A in FIG. 3. One skilled in the art will appreciate that the extruded bracket 30 includes a pair of slots 60 for receipt of the fasteners 34 after each fastener is initially engaged with the respective threaded aperture 50. Therefore, an operator of the vehicle 12 installing the tonneau cover assembly 10 need not try to engage the threads of the fastener 34 with the aperture 50 while in an inconvenient position. The operator need only start each fastener 34 in the respective aperture 50 before sliding the bulbous finger 40 into the seat 58 of the extruded bracket 30.

Figure 4:
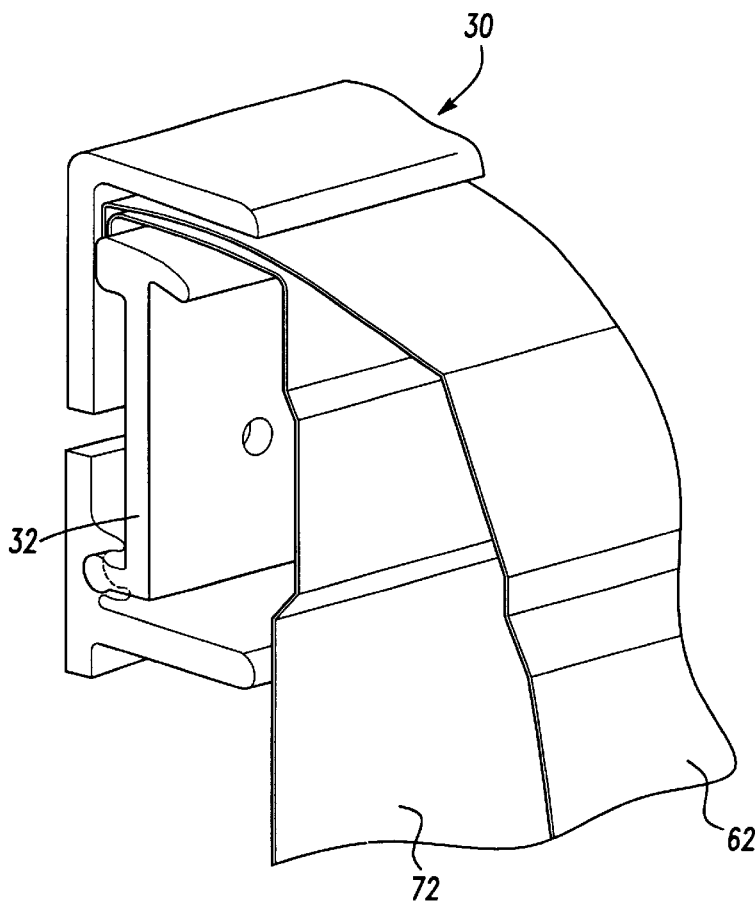
FIG. 4 is a perspective view of a portion of the clamp assembly of the present invention showing the coupler plate in the engaged position.

Referring specifically to FIG. 3, a cross-section of the first side wall 16 is shown in cooperation with the clamp assembly 28. The first side wall 16 includes an outside panel 62 having a vertically oriented portion 64, an arcuate portion 66, a generally horizontal planar portion 68 and terminating at a downwardly extending flange 70. The first side wall 16 further includes an inner panel 72 having a generally vertical portion 74, a generally horizontal portion 76, and a downwardly extending flange 78. Each of the downwardly extending flanges 70 and 78 are interconnected using a method known in the art such as spot welding, riveting or bolting. As shown in FIGS. 3 and 4, the extruded bracket 30 is positioned adjacent the first side wall 16 such that an inner surface 80 of upper rail 52 is in contact with the horizontal planar portion 68 of outside panel 62. Concurrently, an inner surface 82 of side rail 56 is in contact with downwardly extending flange 70 of outside panel 62. Coupler plate 32 is in the disengaged position as extruded bracket 30 is being aligned as described above.

Once the extruded bracket 30 is positioned as noted above, each coupler plate 32 is articulated to the engaged position shown in FIGS. 3 and 4. Specifically, the first bearing surface 46 contacts an inner surface of the downwardly extending flange 78 creating a first restraining area 79 between the first bearing surface 46 and the side rail 56 of the extruded bracket 30. A second restraining area 81 is defined between the second bearing surface 48 and the upper rail 52 when the second bearing surface 48 contacts an inner surface of the horizontal portion 76 of the inner panel 72.

At this time, each fastener 34 is torqued to impart a clamping force between the extruded bracket 30 and the coupler plate 32. Accordingly, the extruded bracket 30 is restrained from movement in a horizontal direction by the first bearing surface 46 acting in concert with the side rail 56. Similarly, the extruded bracket 30 is restrained from moving in a vertical direction by the second bearing surface 48 and the upper rail 52 of the extruded bracket 30. The forces generated by the hammer shaped cam 44 on the inner panel 72 in combination with the coefficient of friction therebetween is sufficient to resist longitudinal movement of the extruded bracket 30 along the first side wall 16.

As shown in FIG. 1, the side walls of cargo carrying vehicles often include spaced apart reinforcing ribs 84 formed on the inner panels 72 and spaced apart from one another. The ribs 84 extend from the horizontal portion 76 (FIG. 3) of the inner panel at least to the bed 14 and project inwardly toward the cargo area 13. To further align and associate the extruded bracket 30 with the first side wall 16, the lower rail 54 includes an aperture 86 (FIG. 2) designed to correspond with the reinforcing ribs 84 should the vehicle 12 have such a structure within the cargo area. If the reinforcing rib 84 is present within the cargo area 13, the aperture 86 accommodates the rib 84 and the lower rail 54 limits longitudinal movement to the amount of clearance existing between the aperture 86 and the reinforcing rib 84.

Figure 5:
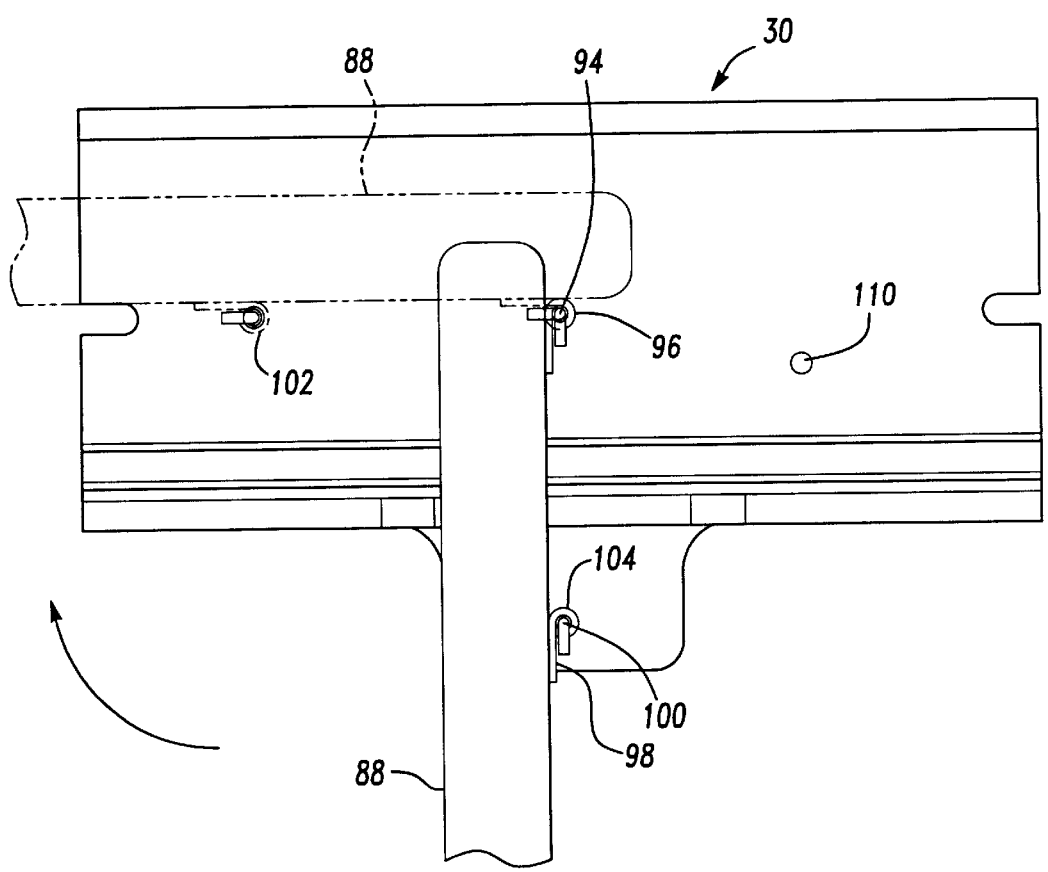
FIG. 5 is a side view of a portion of the divider and clamp assembly of the present invention.

Referring to FIGS. 1, 2 and 3, the tonneau cover assembly 10 further includes an optional lateral divider 88 coupled to the vehicle 12 via clamp assemblies 28 for movement between a deployed position and a retracted position. FIG. 1 depicts the lateral divider 88 in the deployed position separating the cargo area 13 into fore and aft compartments 90 and 92, respectively. The lateral divider 88 is rotatable about an upper cargo latch 94 releasably coupled to a pivot pin aperture 96 formed in the extruded bracket 30. To place the lateral divider 88 in the retracted position as shown in phantom line representation in FIG. 5 the lateral divider is rotated about the upper cargo latch 94 until the lateral divider 88 is substantially parallel to the bed 14. The lateral divider 88 further includes a lower cargo latch 98 having a lock pin 100 selectively disposable in one of first and second lock pin apertures 102 and 104, respectively, formed in extruded bracket 30. The lock pin 100 engages the first lock pin aperture 102 to retain the lateral divider 88 is in its retracted position. The lock pin 100 is engageable with the second lock pin aperture 104 to retain the divider 88 in its deployed position.

Referring to FIGS. 1 and 2, the hinge 26 of the tonneau cover assembly 10 includes a pair of downwardly extending legs 106 located at opposing ends of transversely oriented hinge 26. Each downwardly extending leg 106 further includes a cover pin 108 selectively disposable in a cover pin aperture 110 to allow simple installation and removal of the tonneau cover assembly 10. To prevent rotation of the extending legs 106 about the cover pin 108, guide brackets 111 are coupled to the extruded brackets 30 or integrally formed therein. Each of the guide brackets 111 includes a slot 112 for receipt of a portion of each of the downwardly extending legs 106. The first and second covers 22 and 24, respectively, are installed on the vehicle 12 by simply engaging the cover pin 108 with the cover pin aperture 110.

As shown in FIG. 1, the second cover 24 may be detachably interconnected with the tailgate 20 via rear tonneau cover straps 114 to provide further securement of the second cover 24 to the vehicle 12. One skilled in the art will appreciate that the second cover 24 may also be connected to either of the side walls 16 or 18 via the rear tonneau cover straps 114. One skilled in the art will further appreciate that the rear tonneau cover straps 114 are merely exemplary and that a variety of interconnection devices may be utilized to detachably couple the covers to the vehicle 12.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

We claim:

1. A clamp assembly for mounting a tonneau cover on a motor vehicle having a cargo area defined by first and second side walls, an end wall and a tailgate, the side walls having an inner panel and an outer panel, the clamp assembly comprising:

a first coupler plate having a first end and a second end;

a bracket having a generally horizontal rail, a vertical rail, and a seat, said seat accommodating said first end of said first coupler plate for movement from an operable position to a disengaged position, said clamp assembly defining a first restraining area between said horizontal rail and said second end of said first coupler plate and a second restraining area between said vertical rail and said second end of said first coupler plate when said first coupler plate is in said operable position, said first and second restraining areas adapted to receive one of said first and second side walls to couple said clamp assembly to the motor vehicle; and a fastener detachably connecting said first coupler plate to said bracket when said first coupler plate is in said operable position.

2. The clamp assembly of claim 1, wherein said second end of said first coupler plate includes a first bearing surface defining a portion of said first restraining area.

3. The clamp assembly of claim 2, wherein said second end of said first coupler plate includes a second bearing surface defining a portion of said second restraining area.

4. The clamp assembly of claim 3, wherein said second bearing surface is an arcuate surface.

5. The clamp assembly of claim 1, wherein said first coupler plate has a generally planar body positioned substantially parallel to said vertical rail when said first coupler plate is in said operable position.

6. The clamp assembly of claim 1, further including a second coupler plate pivotally interconnected to said bracket and spaced apart from said first coupler plate.

7. The clamp assembly of claim 1, wherein said bracket includes a lower rail adapted to contact the inner panel of a cargo area for resisting longitudinal movement of said clamp assembly.

8. The damp assembly of claim 1, further including a divider positionable in a deployed and a retracted position, said divider substantially parallel to said horizontal rail when located in said retracted position.

* * * * *